United States Patent
Rozario et al.

(10) Patent No.: US 7,352,748 B1
(45) Date of Patent: Apr. 1, 2008

(54) UPDATING OF ROUTING DATA IN A NETWORK ELEMENT

(75) Inventors: Ranjit Rozario, San Jose, CA (US); Gary S. Delp, Rochester, MN (US)

(73) Assignee: Redback Networks Inc., San Jose, CA (US)

(*) Notice: Subject to any disclaimer, the term of this patent is extended or adjusted under 35 U.S.C. 154(b) by 991 days.

(21) Appl. No.: 10/291,999

(22) Filed: Nov. 12, 2002

Related U.S. Application Data

(60) Provisional application No. 60/368,200, filed on Mar. 28, 2002.

(51) Int. Cl.
*H04L 12/28* (2006.01)
*H04L 12/56* (2006.01)

(52) U.S. Cl. ...................... 370/392; 370/420

(58) Field of Classification Search ............... 370/392, 370/420
See application file for complete search history.

(56) References Cited

U.S. PATENT DOCUMENTS

| | | | |
|---|---|---|---|
| 5,930,254 A | 7/1999 | Liron et al. | |
| 5,951,651 A | 9/1999 | Lakshman et al. | |
| 6,052,683 A | 4/2000 | Irwin | |
| 2002/0038379 A1* | 3/2002 | Sato et al. | 709/238 |
| 2003/0097467 A1* | 5/2003 | Sano | 709/238 |

* cited by examiner

*Primary Examiner*—Kevin C. Harper
(74) *Attorney, Agent, or Firm*—Blakely, Sokoloff, Taylor & Zafman LLP

(57) ABSTRACT

In one embodiment, an apparatus comprises a logic coupled to receive a number of data packets. The logic comprises an execution unit to generate a request for routing data for a data packet of the number of data packets. The logic also includes a memory lookup engine coupled to the execution unit and a local memory. The local memory is to store routing data for the number of data packets. The memory lookup engine is to receive the request and to update the local memory upon determining that the routing data for the data packet is not found in the local memory. Additionally, the logic includes a communication logic coupled to the memory lookup engine. The communication logic is to transmit an update message to a remote logic. The update message is to cause the remote logic to update a remote memory, wherein the update message is transmitted based on a low priority update upon determining that a buffer for update messages of the remote memory is full when the local memory is updated.

35 Claims, 10 Drawing Sheets

UPDATING OF ROUTING DATA IN A NETWORK ELEMENT

CROSS REFERENCE TO RELATED APPLICATION

This application claims the benefit of U.S. provisional patent application No. 60/368,200, entitled "Updating of Routing Data in a Network Element," filed Mar. 28, 2002.

FIELD OF THE INVENTION

The invention relates to the field of communications. More specifically, the invention relates to updating of routing data in a network element.

BACKGROUND OF THE INVENTION

In the field of communications, the need for high-speed transmission of data including video and audio has continued to increase. Moreover, in addition to the demand for higher bandwidth, there has also been an increased need for various types of services that employ different protocols. Further, customers of high-speed networks (e.g., companies providing different networking services) may desire to transport data employing packet-based data streams. Examples of the types of packets that can be placed into such data streams include Asynchronous Transfer Mode ("ATM"), Internet Protocol ("IP"), Frame Relay, Voice Over IP, and Point-to-Point Protocol ("PPP").

Different network elements can be employed in various network configurations to allow for transmission of these packets. One type of network element is a bridge as defined by the IEEE 802.1 standard. Bridges can be employed to interconnect local area networks (LANs). In contrast to routers, bridges are independent of a given protocol. Accordingly, a bridge acts as a forwarding mechanism without analyzing and routing based on protocols of the given packets.

One type of bridge is the learning bridge, which examines the source address within packets being received on a port and generates and updates its internal tables to associate the port with the given source address. Accordingly, if a packet having this address as its destination is received, the bridge can forward this packet to the associated port stored within its internal table. However, if a packet is received wherein the destination address is not included with the internal tables, the bridge floods the packet to the different ports associated with the spanning tree for this source port. Disadvantageously, this flooding of packets across different ports can overwhelm such ports and cause the loss of packets because the ports will not be able to process all of the incoming packets.

One conventional approach for a network element that includes a learning bridge is to include a common database stored in a control card, which is shared across a number of line cards within the network element. Accordingly, when a line card receives packets wherein the common database needs to be updated, the line card communicates this information to the control, which updates the common database. Disadvantageously, the control card is required to be executing at least as fast as:

$$2 * \text{the line rate} * \text{the number of line cards} \quad (1)$$

in order to handle the updates to the common database when the line cards are receiving and transmitting at an optimal rate and thereby preclude the flooding of packets across the different ports of the line cards.

Another typical approach for a network element that includes a learning bridge is to include a database on each line card, that is shared by the ingress and egress portions of the line card. However, the logic that is updating this database on the line card is required to be executing at least as fast as:

$$2 * \text{the line rate} \quad (2)$$

in order to handle the updates to this database when the line card is receiving and transmitting at an optimal rate and thereby preclude the flooding of packets across the different ports of the line cards.

SUMMARY OF THE INVENTION

A method and apparatus for updating of routing data in a network element are described. In one embodiment, an apparatus comprises a logic coupled to receive a number of data packets. The logic comprises an execution unit to generate a request for routing data for a data packet of the number of data packets. The logic also includes a memory lookup engine coupled to the execution unit and a local memory. The local memory is to store routing data for the number of data packets. The memory lookup engine is to receive the request and to update the local memory upon determining that the routing data for the data packet is not found in the local memory. Additionally, the logic includes a communication logic coupled to the memory lookup engine. The communication logic is to transmit an update message to a remote logic. The update message is to cause the remote logic to update a remote memory, wherein the update message is transmitted based on a low priority update upon determining that a buffer for update messages of the remote memory is full when the local memory is updated.

In one embodiment, an apparatus comprises an execution unit to generate a request for routing data for a data packet. The apparatus also comprises a content addressable memory (CAM) lookup engine coupled to a CAM. The CAM is to store routing data for data packets. The CAM lookup engine is to receive the request and to update the CAM upon determining that the routing data for the data packet is not found in the CAM. The apparatus also includes a communication logic coupled to the CAM lookup engine. The communication logic is to transmit an update message to a remote logic. The update message is to cause the remote logic to update a remote memory, wherein the update message is based on a low priority update upon determining that a buffer for update message is not receiving update messages when the CAM is updated.

In an embodiment, a computer-implemented method includes receiving a request for routing data for a data packet in a local memory of a first portion of a line card in a network element. The method also comprises updating the local memory upon determining that the routing data for the data packet is not found. Additionally, the method includes updating a remote memory with the routing data for the data packet of a second portion of the line card of the network element. The updating of the remote memory comprises updating the remote memory through a low priority update upon determining that the remote memory is unavailable when the local memory is updated.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, network element 100 can be located in FIG. 1. However, element numbers are the same for those elements that are the same across different Figures. In the drawings.

DETAILED DESCRIPTION

A method and apparatus for updating of routing data in a network element are described. In the following description, for purposes of explanation, numerous specific details are set forth in order to provide a thorough understanding of the present invention. It will be evident, however, to one skilled in the art that the present invention may be practiced without these specific details.

Overview

Embodiments of the invention provide for separate memories that are associated with an ingress and an egress portion of a line card within a network element for the processing of data packets being receiving into and out the network element. Such memories store routing information for data packets (such as the address, slot, circuit etc.) Additionally, in one embodiment, these network elements are employed as a bridge as defined by the IEEE 802.1 standard. However, embodiments of the invention are not so limited, as other types of network elements can incorporate embodiments of the invention.

As will be described in more detail below, embodiments of the invention allow for updating of the memories for the egress portion by the ingress portion using both real time and low priority updates. Similarly, embodiments of the invention allow for updating of the memories for the ingress portion by the egress portion using both real time and low priority updates. Accordingly, in an embodiment, the logic updating these memories on the line card execute at least as fast as: (1*the line rate) for the line card in order to handle the updates to the memories when the line card is receiving and transmitting at an optimal rate and thereby preclude the flooding of packets across the different ports of the line cards (as described above).

FIGS. 1-4 show block diagrams of exemplary systems for updating of routing data in a network element, in accordance with embodiments of the invention. FIGS. 5, 7-9 show flow diagrams illustrating operations for updating of routing data in a network element, according to embodiments of the invention. The operations of the flow diagrams will be described with references to the exemplary systems shown in the block diagrams. However, it should be understood that the operations of the flow diagrams could be performed by embodiments of systems other than those discussed with reference to the block diagrams, and embodiments discussed with reference to the systems could perform operations different than those discussed with reference to the flow diagrams.

Further, the figures are described with reference to "local" and "remote." As will be described, "local" ingress logic, memories, etc. are considered "remote" with reference to egress logic, memories, etc. Similarly, "local" egress logic, memories, etc. are considered "remote" with reference to ingress logic, memories, etc.

Network Element Description

Figure 1:
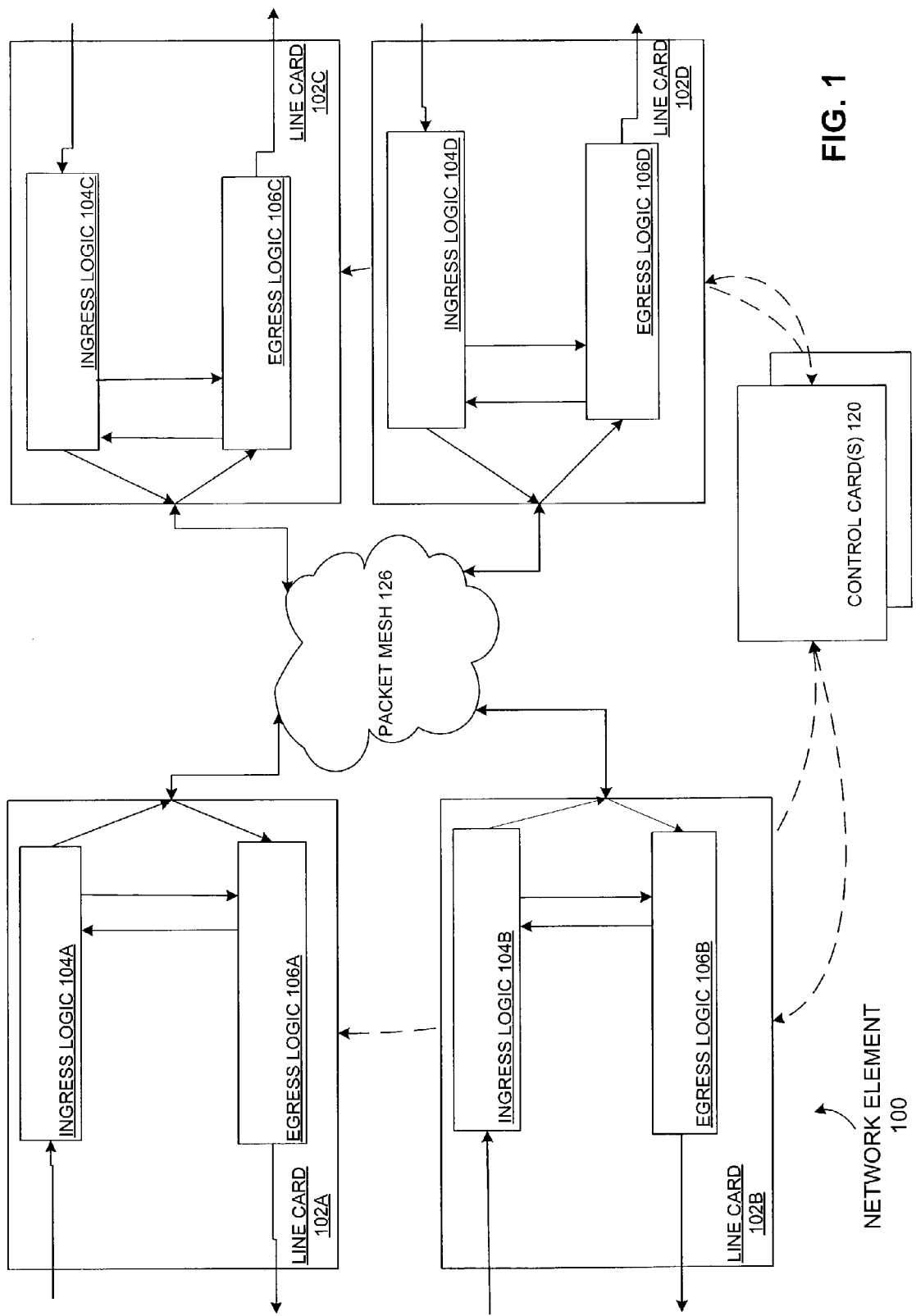
FIG. 1 illustrates portions of a network element, according to an embodiment of the invention.

FIG. 1 illustrates portions of a network element, according to an embodiment of the invention. As shown, FIG. 1 illustrates network element 100 that includes line cards 102A-D and control card(s) 120, such that control card(s) 120 are coupled to each of line cards 102A-D. The number of line cards illustrated are for the sake of simplicity and not by way of limitation, as a lesser or greater number of line cards can be included within network element 102. Additionally, network element 102 includes a first switch fabric, packet mesh 126, which includes a full mesh such that each of line cards 102A-D are coupled to one another. For example, line card 102A is coupled to line cards 102B-D through packet mesh 126. However, embodiments of the invention are not limited to a full mesh for the transmission of packets among line cards 102A-D, as any type of switching method that switches based on the addressing scheme described herein can be incorporated into embodiments of the invention. For example, in one embodiment, line cards 102A-D could be coupled together using a switch fabric, such that the line cards are coupled to a control card, which provides for the switching therein.

Line cards 102A-D include ingress logic 104A-D and egress logic 106A-D, respectively. In an embodiment, ingress logic 104 and egress logic 106 are coupled to receive data packets, as shown. In an embodiment, physical connection circuitries (not shown) are coupled to the lines external to network element 100, which can carry optical and/or electrical signals. Accordingly, in one such embodiment, the physical connection circuitries process these signals and forward the data packets therein to ingress logic 104 for further processing (which is described in more detail below). Additionally, in an embodiment, the physical connection circuitries process the data packets being transmitted from egress logic 106 wherein the data packets are places within these optical and/or electrical signals.

In one embodiment, line cards 102A-D of network element 100 may be connected to an optical line transmitting Synchronous Optical Network (SONET) optical carrier (OC)-N signals. Moreover, in an embodiment, line cards 102A-D of network element 100 may be connected to an electrical line such as a T1, T3, E1, E3, Ethernet, Gigabit Ethernet, etc. However, embodiments of the invention are not limited to the above-described examples, as any other type of optical or electrical data transmission can be incorporated into embodiments of the invention. In other embodiments, ingress logic 104 and egress logic 106 receive and transmit, respectively, the data packets into and out from line card 102, independent of physical connection circuitries.

Ingress logic 104A-D are coupled to packet mesh 126. Egress logic 106A-D are coupled to packet mesh 126. Accordingly, ingress logic 104A-D are coupled to egress logic 106A-D on other line cards 102A-D, through packet mesh 126. Ingress logic 104A-D are coupled to lines that are external to line cards 102A-D, such that data packets received into ingress logic 104A-D are transmitted to the appropriate egress logic 106A-D through packet mesh 126. Moreover, egress logic 106A-D are coupled to lines that are external to line cards 102A-D, such that data packets coming from ingress logic 104A-D through packet mesh 126 are transmitted out from the line cards 102A-D through egress logic 106A-D.

Line cards incorporated into embodiments of the present invention are not limited to those illustrated by line cards 102A-D. Moreover, the network elements can have different line card configurations from that shown by line cards 102A-D. For example, a given network element could be limited to a single line card that can receive and transmit data packet traffic, employing multiple interfaces for the receipt and transmittal of such traffic.

Ingress Logic and Egress Logic

Figure 2:
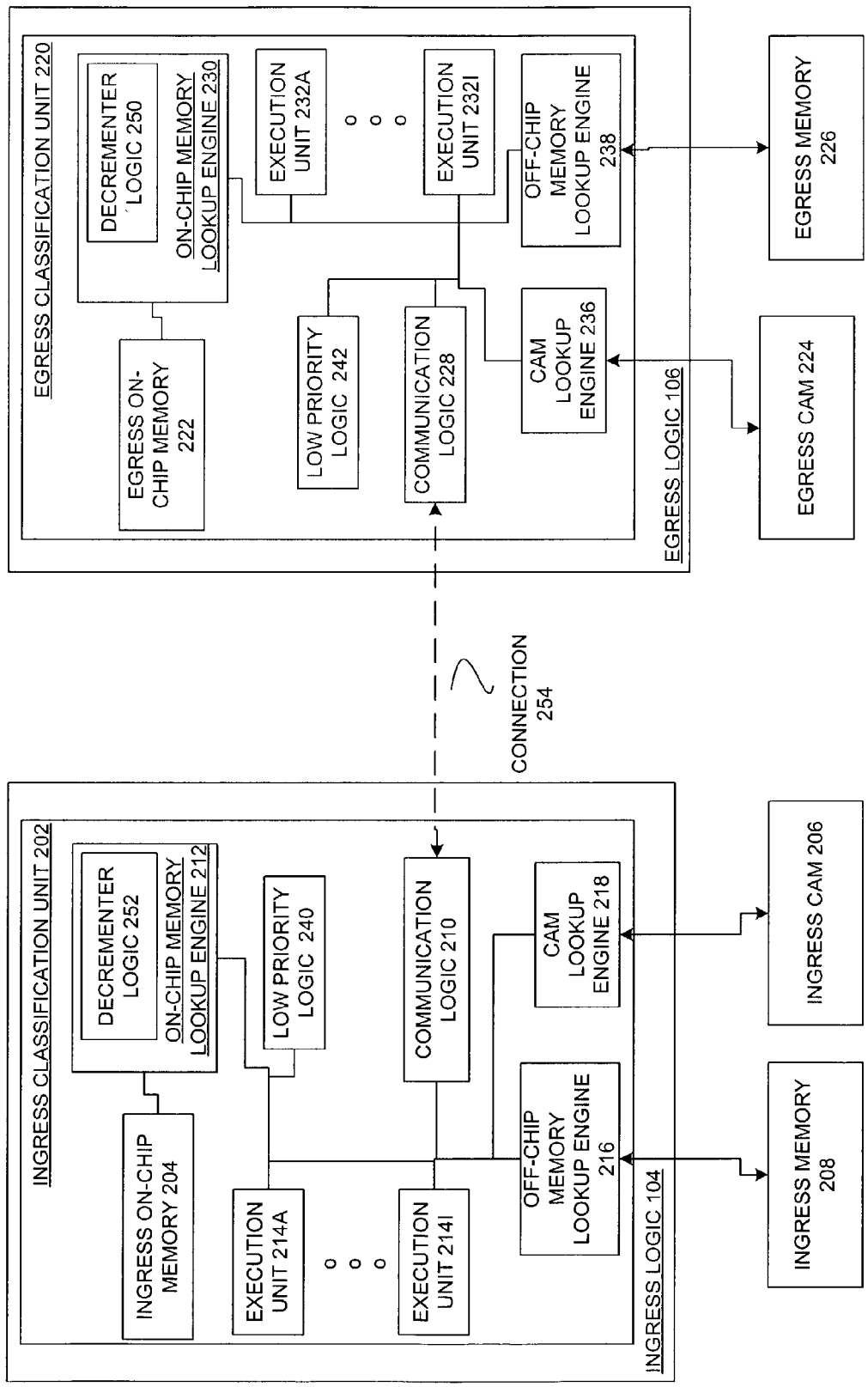
FIG. 2 is a more detailed block diagram of an ingress logic, an egress logic, and associated memory, according to one embodiment of the invention.

FIG. 2 is a more detailed block diagram of an ingress logic, an egress logic, and associated memory, according to one embodiment of the invention. As illustrated, ingress logic 104 comprises ingress classification unit 202, and egress logic 106 comprises egress classification unit 220.

With regard to ingress logic 104, as will be described in more detail below, in an embodiment, ingress classification unit 202 classifies packets that arrive at its input and provide the results of the classification at the output. In one embodiment, ingress classification unit 202 receives a stream of packet headers, and for each header, ingress classification unit 202 (1) extract fields, (2) create keys based on the fields, (3) perform lookups on the keys, (4) collect decision information related to the packets and (5) provide an output stream comprising: a packet identifier, an output queue, a traffic bucket, etc. Additionally, in one embodiment, ingress classification unit 202 includes the functionality for causing the network elements containing a line card with ingress classification unit 202 to act as a learning bridge, as defined by the IEEE 802.1 standard. Bridges can be employed to interconnect local area networks (LANs). In contrast to routers, bridges are independent of a given protocol. Accordingly, a bridge acts as a forwarding mechanism without analyzing and routing based on protocols of the given packets. With regard to a learning bridge, such a bridge examines the source address within packets being received on a port and generates and updates its internal tables to associate the port with the given source address.

Ingress classification unit 202 includes ingress on-chip memory 204, on-chip memory lookup engine 212, execution units 214A-I, communication logic 210, low priority logic 240, off-chip memory lookup engine 216 and (Content Addressable Memory) CAM lookup engine 218. Execution unit 214A-I, on-chip memory lookup engine 212, low priority logic 240, communication logic 210, off-chip memory lookup engine 216 and CAM lookup engine 218 are coupled together.

On-chip memory lookup engine 212 includes decrementer logic 252. On-chip memory lookup engine 212 is coupled to ingress on-chip memory 204. In an embodiment, ingress on-chip memory 204 can be different types of random access memory (RAM). Additionally, as will be described in more detail below, in an embodiment, ingress on-chip memory 204 stores a table of timer bits and delayed update bits for a number of locally learned entries for forwarding packets for the learning bridge.

Off-chip memory lookup engine 216 is coupled to ingress memory 208 (that, in an embodiment, is external to ingress logic 104). In an embodiment, ingress memory 208 can be different types of memory, including different types of RAM, such as dynamic RAM (DRAM). As will be described in more detail below, ingress memory 208 includes a number of tables that can store a number of entries (both locally and remotely learned) for the learning bridge. In an embodiment, these entries can include the slot identification for the line card on which ingress logic 104 resides on which the packet was received. Additionally, these entries can include the circuit on which the packet was received.

CAM lookup engine 218 is coupled to ingress CAM 206 (that, in an embodiment, is external to ingress logic 104). As will be described in more detail below, in an embodiment, ingress CAM 306 can include a number of tables that can store a number of entries (both locally and remotely learned) associated with the learning bridge. These entries can include the Media Access Control (MAC) address and the virtual LAN (VLAN) identification of a given network element that is the source of a packet, etc.

With regard to egress logic 106, as will be described in more detail below, in an embodiment, egress classification unit 220 classifies packets that arrive at its input and provide the results of the classification at the output. In one embodiment, egress classification unit 220 receives a stream of packet headers, and for each header, egress classification unit 220 (1) extract fields, (2) create keys based on the fields, (3) perform lookups on the keys, (4) collect decision information related to the packets and (5) provide an output stream comprising: a packet identifier, an output queue, a traffic bucket, etc. Additionally, in one embodiment, egress classification unit 220 includes the functionality for causing the network elements containing a line card with egress classification unit 220 to act as a learning bridge, as defined by the IEEE 802.1 standard.

Egress classification unit 220 includes egress on-chip memory 222, on-chip memory lookup engine 230, execution units 232A-I, communication logic 228, low priority logic 242, off-chip memory lookup engine 238 and CAM lookup engine 236. Execution units 232A-I, on-chip memory lookup engine 230, low priority logic 242, communication logic 228, off-chip memory lookup engine 238 and CAM lookup engine 236 are coupled together.

On-chip memory lookup engine 230 includes decrementer logic 250. On-chip memory lookup engine 230 is coupled to egress on-chip memory 222. In an embodiment, egress on-chip memory 222 can be different types of random access memory (RAM). Additionally, as will be described in more detail below, in an embodiment, egress on-chip memory 222 stores a table of timer bits and delayed update bits for a number of locally learned entries for forwarding packets for the learning bridge.

Off-chip memory lookup engine 238 is coupled to egress memory 226 (that, in an embodiment, is external to egress logic 106). In an embodiment, egress memory 226 can be different types of memory, including different types of RAM, such as dynamic RAM (DRAM). As will be described in more detail below, egress memory 226 includes a number of tables that can store a number of entries (both locally and remotely learned) for the learning bridge. In an embodiment, these entries can include the slot identification for the line card on which egress logic 106 resides on which the packet was received. Additionally, these entries can include the circuit on which the packet was received.

CAM lookup engine 236 is coupled to egress CAM 236 (that, in an embodiment, is external to egress logic 106). As will be described in more detail below, in an embodiment, egress CAM 236 can include a number of tables that can store a number of entries (both locally and remotely learned) associated with the learning bridge. These entries can include the Media Access Control (MAC) address and the virtual LAN (VLAN) identification of a given network element that is the source of a packet, etc.

Additionally, ingress classification unit 202 is coupled by connection 254 to egress classification unit 220 through communication logic 210 and communication logic 228, respectively. In one embodiment, connection 254 includes a clock connection and five connections for the transmission of data. As will be described in more detail below, in one embodiment, connection 254 allows for updates of the tables stored within on-chip memories 204 and 222, memories 208 and 226, and CAMs 206 and 224. In particular, when an update to an entry on the ingress side is made, this update is transmitted to the egress side to allow for the updating of its tables with this information.

For example, if a packet is received from a source whose address is not included within the tables of ingress CAM 206, ingress on-chip memory 204 and ingress memory 208, ingress classification unit 202 adds an entry with the information from this packet into ingress CAM 206, ingress on-chip memory 204 and ingress memory 208. Additionally, using communication 254, ingress classification unit 202 adds an entry into egress CAM 224, egress on-chip memory 222 and egress memory 226. Accordingly, upon receipt of packets having this address as their destination, the tables within the memories of egress logic 106 (egress CAM 224, egress memory 226 and egress on-chip memory 222) have the appropriate port and circuit on which the packet is to be transmitted. Moreover, egress classification unit 220 is not required to flood its ports to determine the appropriate port on which the packet is to be transmitted.

Additionally, as will be described in more detail below, in one embodiment, the updating of egress memories by ingress logic 104 (and vice versa) is such that the egress memories are updated when the ingress memories are updated. In one embodiment, the updating of egress memories by ingress logic 104 (and vice versa) is such that the egress memories are updated at a later time in reference to when the ingress memories are updated. In one such embodiment, this delay occurs when egress classification unit 220 is performing local updates to egress memories, thereby not allowing ingress classification unit 202 to perform an update of these remote memories.

Figure 3:
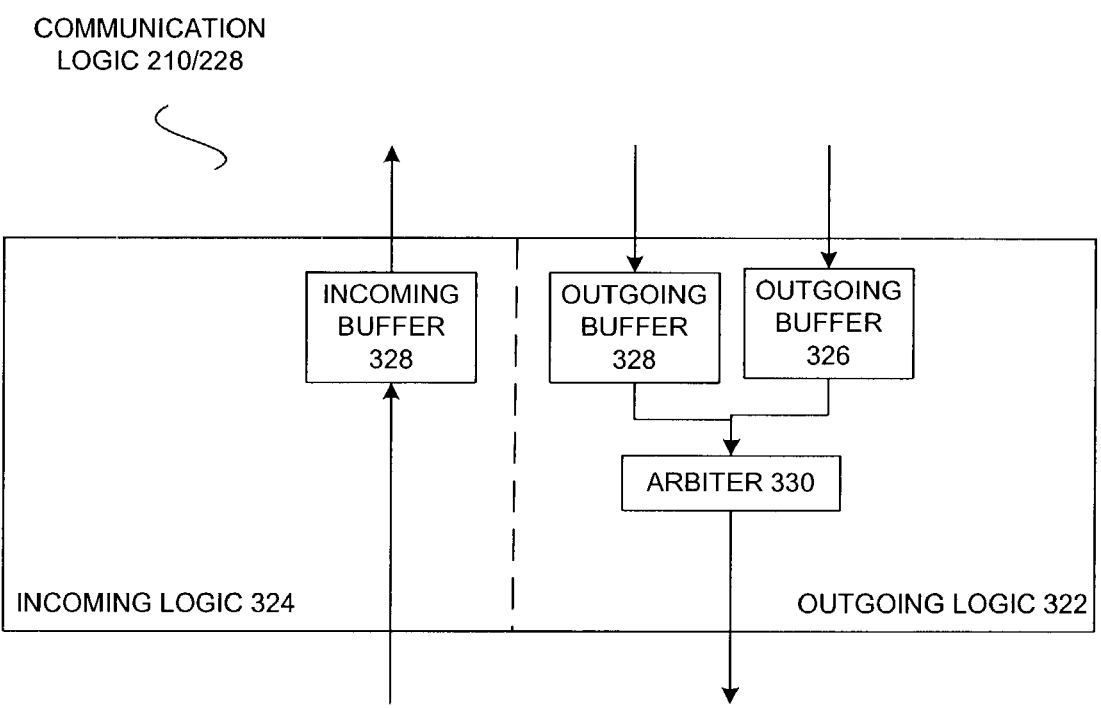
FIG. 3 illustrates a more detailed block diagram of communication logic for communication between the ingress logic and egress logic, according to one embodiment of the invention.

FIG. 3 illustrates a more detailed block diagram of communication logic for communication between the ingress logic and egress logic, according to one embodiment of the invention. As shown, communication logic 210/228 comprises incoming logic 324 and outgoing logic 322.

Incoming logic 324 includes incoming buffer 328 that receives data communications from the other communication logic on the other ingress/egress logic. For example, communication logic 210 within ingress classification unit 202 receives the data communications into incoming buffer 328 from communication logic 228 within egress classification unit 220.

Outgoing logic 322 includes outgoing buffer 326, outgoing buffer 328 and arbiter 330. Outgoing buffer 326 and outgoing buffer 328 are coupled to receive data communications from units within the classification unit that includes communication logic 210/228 (e.g., CAM lookup engine 218). In one embodiment, outgoing buffer 326 is coupled to receive data communications related to real-time updates of entries in memories made within the local classification unit that are being transmitted to the remote classification unit. For example, with regard to ingress classification unit 202, outgoing buffer 326 within communication logic 210 is coupled to receive data communications related to the real-time updates made to entries within ingress memory 208 and ingress CAM 206.

In one embodiment, outgoing buffer 328 is coupled to receive data communications related to low priority updates for entries stored in off-chip memory and CAM. For example, with regard to ingress classification unit 202, outgoing buffer 328 within communication logic 210 is coupled to receive data communications related to low priority updates for entries stored in ingress memory 208 and ingress CAM 206.

Additionally, the outputs of outgoing buffer 326 and outgoing buffer 328 are coupled to inputs of arbiter 330. Arbiter 330 determines which entries within outgoing buffer 326 and outgoing buffer 328 are transmitted to the remote classification unit. In one embodiment, the real-time updates within outgoing buffer 326 are given a higher priority than the low-priority updates within outgoing buffer 328. Accordingly, arbiter 330 outputs an entry within outgoing buffer 328 when output buffer 326 is empty. However, embodiments of the invention are not so limited. For example, in another embodiment, the entries within outgoing buffer 326 and outgoing buffer 328 are serviced in a round-robin order, such that arbiter 330 outputs an entry from outgoing buffer 326 and then an entry from outgoing buffer 328 and then an entry from outgoing buffer 326, etc.

Moreover, embodiments of communication logic 210/228 are not limited those illustrated in FIG. 3. For example, in another embodiment, outgoing logic 322 does not include a single outgoing buffer with an arbiter. Accordingly, both real-time updates and low priority updates are stored in a same outgoing buffer. The operations of communication logic 210/228 are described in more detail below.

Figure 4:
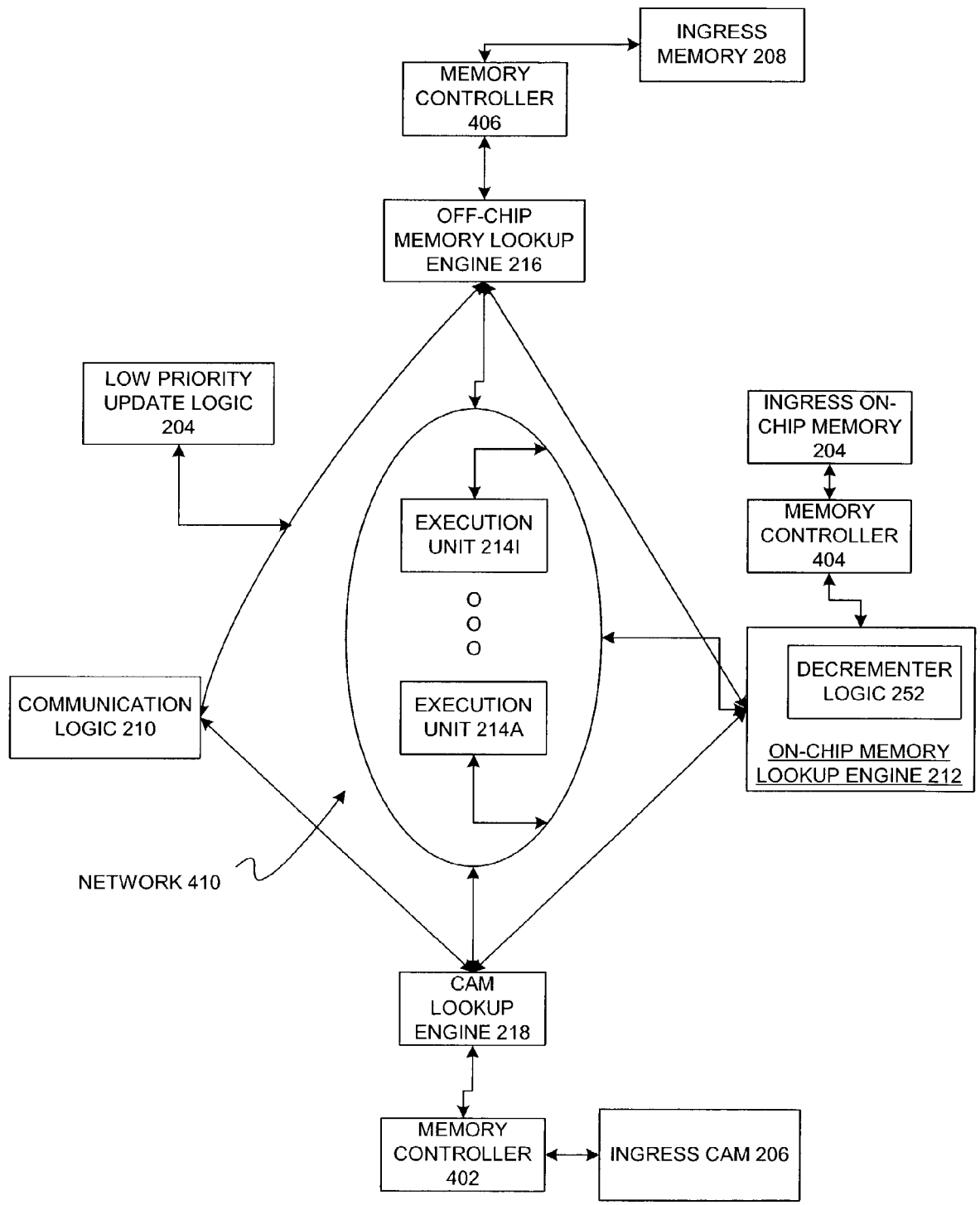
FIG. 4 is a more detailed block diagram of an ingress/egress logic and associated memory, according to one embodiment of the invention.

FIG. 4 is a more detailed block diagram of an ingress/egress logic and associated memory, according to one embodiment of the invention. In particular, ingress logic 104 or egress logic 106 and associated memories can include the configuration illustrated within FIG. 4. Additionally, FIG. 4 will be described in terms of ingress logic 106 and its associated memories. However, the configuration shown in FIG. 4 is also applicable to egress logic 106 and its associated memories.

As shown, ingress logic 104 includes execution units 214A-I. Execution units 214A-I are coupled to network 410. Additionally, network 410 is coupled to off-chip memory lookup engine 216, on-chip memory lookup engine 212, CAM lookup engine 218, communication logic 210 and low priority update logic 204. The number of execution units and lookup engines illustrated within FIG. 4 are by way of example and not by way of limitation, as a lesser or greater number of such units can be incorporated into embodiments of the invention. In one embodiment, the number of execution units is 64. In an embodiment, the number of lookup engines is 16.

As illustrated, network 410 provides connectivity between execution units 214 and off-chip memory lookup engine 216, on-chip memory lookup engine 212, CAM lookup engine 218, communication logic 210 and low priority update logic 204. In one embodiment, this connectivity is achieved through two different networks, wherein a first network provides communications from execution units 214 to off-chip memory lookup engine 216, on-chip memory lookup engine 212, CAM lookup engine 218, communication logic 210 and low priority update logic 204; and a second network provides communications from off-chip memory lookup engine 216, on-chip memory lookup engine 212, CAM lookup engine 218 to execution units 214.

Additionally, off-chip memory lookup engine 216 is coupled to on-chip memory lookup engine 212. On-chip memory lookup engine 212 is coupled to CAM lookup engine 218. CAM lookup engine 218 is coupled to communication logic 210. Communication logic 210 is coupled to low priority update logic 204. Low priority update logic 204 is coupled to off-chip memory lookup engine 216. Accordingly, in an embodiment, there are communications among off-chip memory lookup engine 216, on-chip memory lookup engine 212, CAM lookup engine 218, communication logic 210 and low priority update logic 204, independent of network 410. These communications are described in more detail in co-pending patent application, entitled "A Method and Apparatus for Accessing Routing Data from Memory", Ser. No. 10/292,000, filed Nov. 12, 2002 to Ranjit Rozario, which is hereby incorporated by reference.

Off-chip memory lookup engine 216 is coupled to memory controller 406, which is coupled to ingress memory 208. On-chip memory lookup engine 212 (that includes decrementer logic 252) is coupled to memory controller 404, which is coupled to ingress on-chip memory 204. CAM lookup engine 218 is coupled to memory controller 402, which is coupled to ingress CAM 206.

Moreover, in one embodiment, off-chip memory lookup engine 216, on-chip memory lookup engine 212 and CAM lookup engine 218 receive lookup requests from one of execution units 214 and perform a number of lookups into their associated memories through associated memory controllers. Additionally, in one embodiment, when data is received back from the associated memories, such lookup engines interpret the data and return a response to the requesting execution unit 214 and/or generate additional lookup requests to itself and/or another of lookup engines in order to further process the lookup request into a same and/or different memory. Such operations are described in more detail below. Further, the configuration illustrated in FIG. 4 is by way of example and not by way of limitation, as a same logic block can include multiple functions. For example, in another embodiment, low priority update logic 204 and/or communication logic 210 can be within CAM lookup engine 218.

Processing of Lookup Requests

Figure 5A:
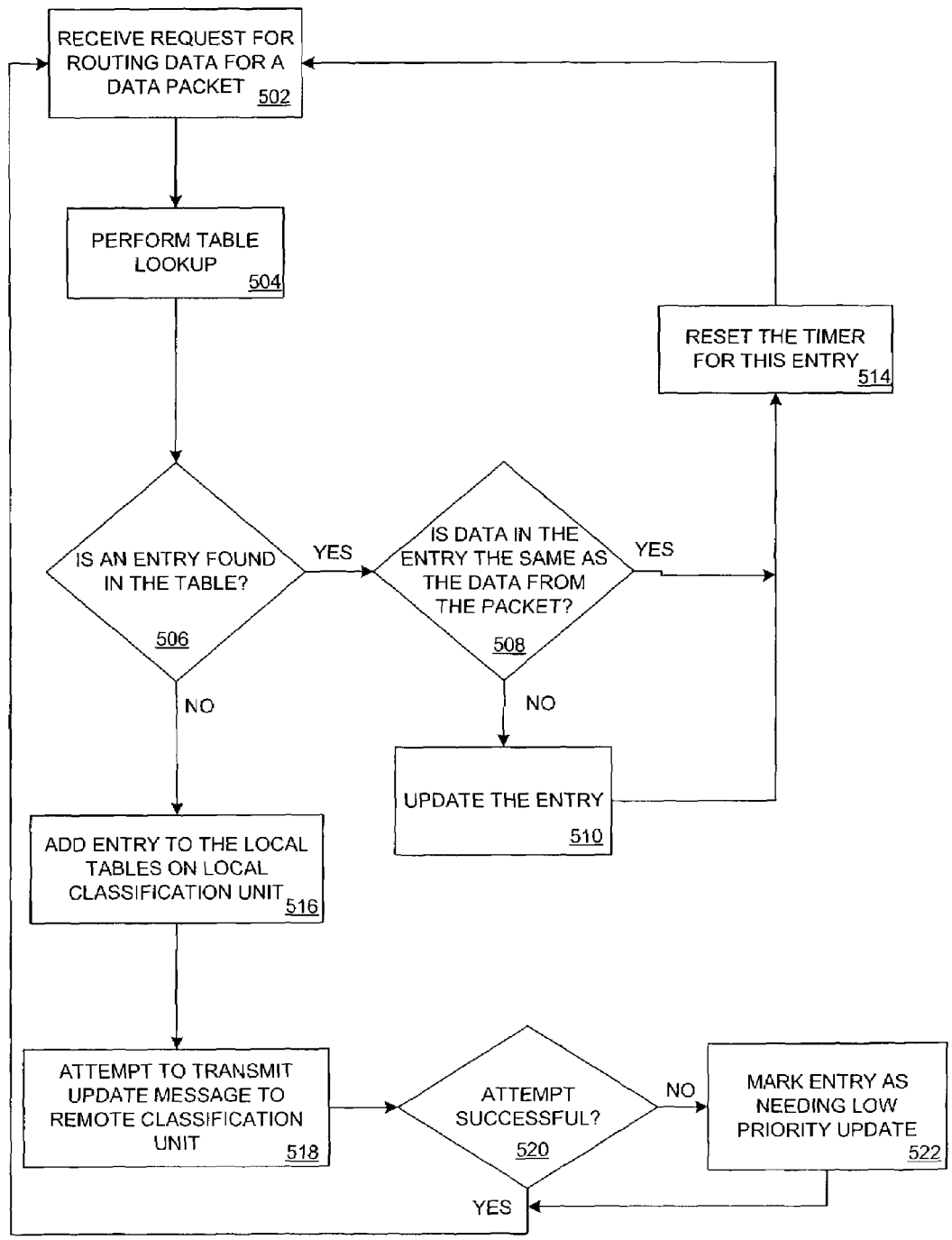
FIG. 5A illustrates a flow diagram for processing of lookup requests for the source address of a packet, according to one embodiment of the invention.
Figure 5B:
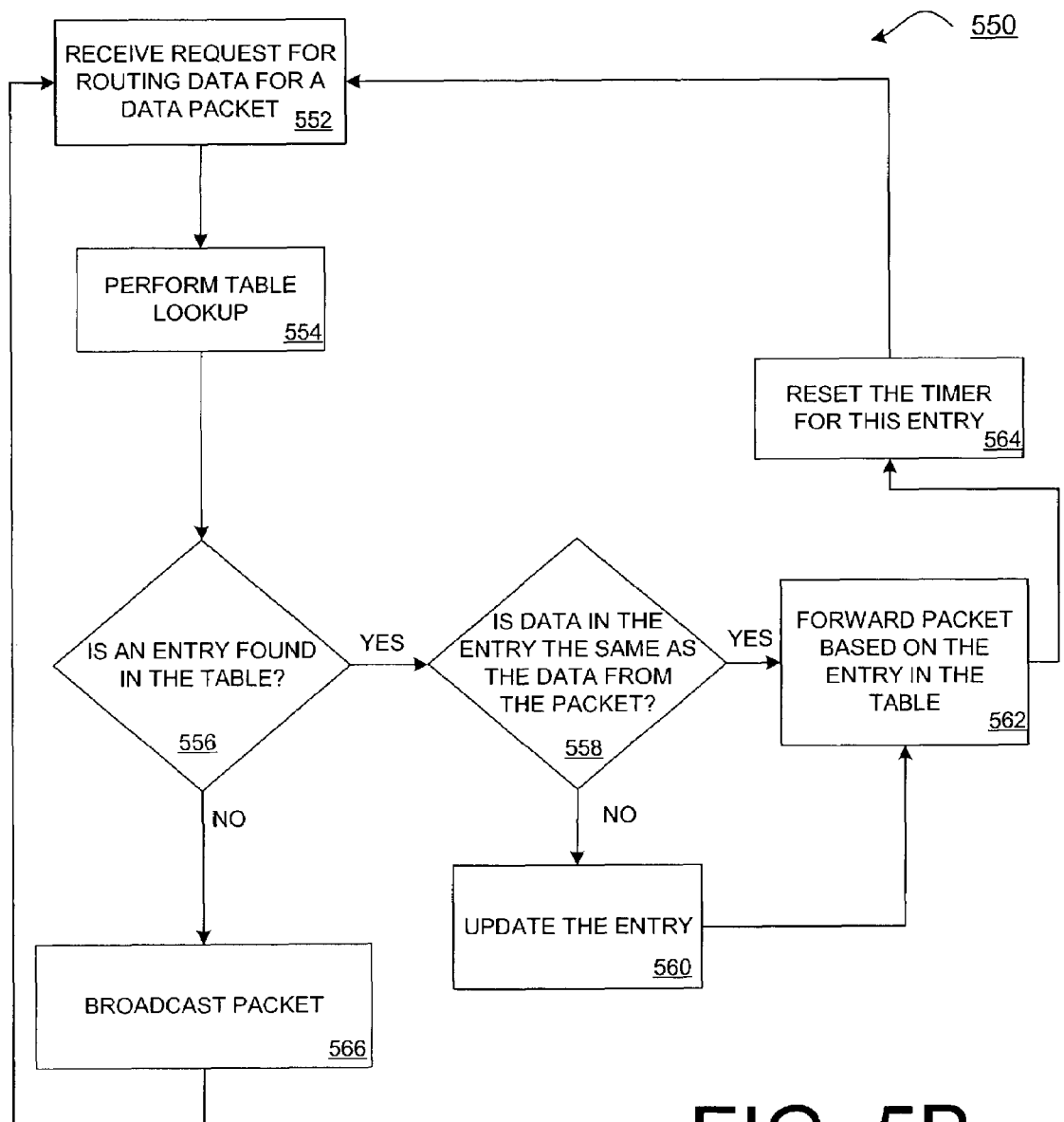
FIG. 5B illustrates a flow diagram for processing of lookup requests for the destination address of a packet, according to one embodiment of the invention.

The operations of processing of lookup requests will now be described. In particular, FIGS. 5A-5B are flow diagrams for processing of lookup requests, according to embodiments of the invention. In particular, FIG. 5A illustrates a flow diagram for processing of lookup requests for the source address of a packet, according to one embodiment of the invention, while FIG. 5B illustrates a flow diagram for processing of lookup requests for the destination address of a packet, according to one embodiment of the invention. In one embodiment, for a given packet received within a line card of the network element, the operations illustrated in the flow diagrams of FIGS. 5A and 5B are performed. Accordingly, for a given packet, logic within the line card performs a lookup requests based on the source address and a lookup requests based on the destination address.

The operation of flow diagrams 500 and 550 of FIGS. 5A and 5B will be described with reference to the exemplary systems shown FIGS. 2-4. Additionally, the operation of flow diagrams 500 and 550 will be describe with reference to receiving a processing of packets by ingress logic 104. However, the operations of flow diagrams 500 and 550 are also applicable to egress logic 106. The operations of flow diagram 500 of FIG. 5A will now be described.

In block 502, a request for a table lookup for a packet is received. With reference to the exemplary embodiment of FIG. 4, CAM lookup engine 218 receives the request for a table lookup for a packet. In an embodiment, the packet received is based on different standards, such as ATM, IP, Frame Relay, voice over IP, PPP, Ethernet, etc. In one embodiment, one of execution units 214 within ingress classification unit 202 receive a packet and extracts the relevant routing data from the packet (such as the packet header that include the source address, source port, destination address and destination port). In one embodiment, the source address and the destination address are Media Access Control (MAC) addresses. Execution unit 214 generates a request for a table lookup for the packet received and transmits this request to CAM lookup engine 218.

In block 504, a table lookup is performed. With reference to the exemplary embodiment of FIG. 4, CAM lookup engine 218 performs the table lookup into ingress CAM 206 through memory controller 402. In an embodiment, CAM lookup engine 218 performs the table lookup based on the source MAC address from within the packet header.

Figure 6:
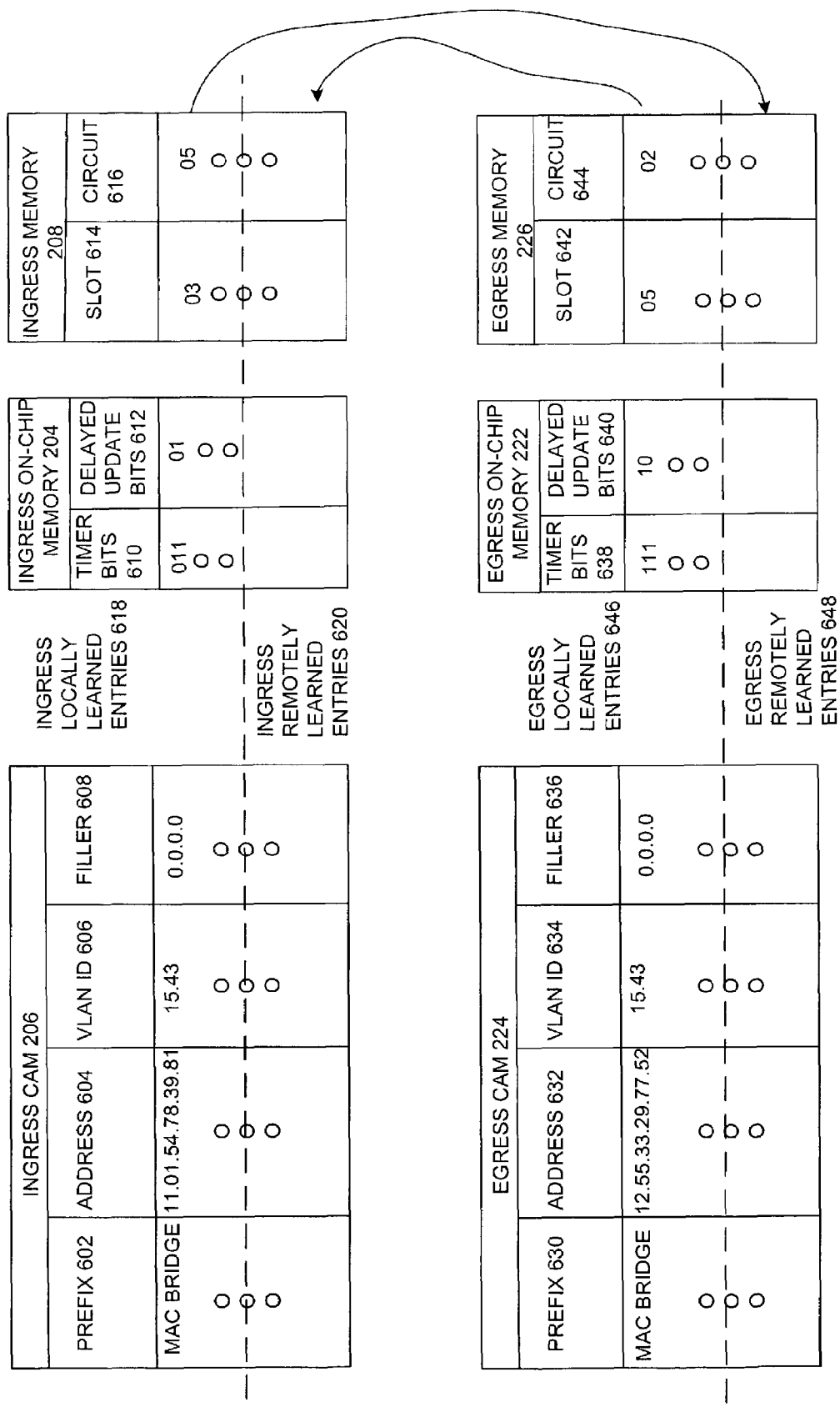
FIG. 6 illustrates a number of memories for storage of tables for address entries, according to one embodiment of the invention.

To help illustrate, FIG. 6 illustrates a number of memories for storage of tables for address entries, according to one embodiment of the invention. As shown, FIG. 6 includes memories for ingress logic 104 and egress logic 106.

With regard to ingress memories, ingress CAM 206, ingress on-chip memory 204 and ingress memory 208 include a number of tables, such that the tables comprise a number of address entries. In an embodiment, an address entry stored in a table within ingress CAM 206 has a corresponding address entry stored in a table within ingress on-chip memory 204 as well as a corresponding address entry stored in a table within ingress memory 208. In an embodiment, an address entry stored in a table within ingress CAM 206 includes prefix 602, address 604, virtual local area network (VLAN) identification 606 and filler 608. In one embodiment, an address entry stored in a table within ingress on-chip memory 204 includes timer bits 610 and delayed update bits 612. In one embodiment, an address entry stored in a table within ingress memory 208 includes slot 614 and circuit 616.

To help illustrate, ingress CAM 206 includes an address entry that includes MAC bridge for prefix 602, 11.01.54.78.39.81 for address 604, 15.43 for VLAN identification 606 and 0.0.0.0 for filler 608. The corresponding address entry within ingress on-chip memory 204 includes 011 for timer bits 610 and 01 for delayed update bits 612. The corresponding address entry within ingress memory 208 includes 03 for slot 614 and 05 for circuit 616.

Moreover, as shown, in an embodiment, the address entries stored within ingress CAM 206, ingress on-chip memory 204 and ingress memory 208 are divided into a number of sections. In one embodiment, the sections include a section for ingress locally learned entries 618 and a section for ingress remotely learned entries 620. As will be described in more detail below, ingress locally learned entries 618 are those address entries that are learned from packets received into ingress logic 104. Returning to FIG. 1 to help illustrate, assume ingress logic 104 receives a packet wherein the source address of the packet is not found within the entries for address 604 in ingress CAM 206. Accordingly, ingress classification unit 202 generates a new address entry, as one of ingress locally learned entries 618, for this source address within ingress CAM 206, ingress on-chip memory 204 and ingress memory 208.

Additionally, as will be described in more detail below (and as noted by the arrows within FIG. 6), ingress remotely learned entries 620 are those address entries that are learned from packets that received into egress logic 106. In particular in one embodiment, a new address entry (within ingress CAM 206, ingress on-chip memory 204 and ingress memory 208) is generated by CAM lookup engine 236 (within egress classification unit 220), wherein communication logic 228 transmits this new information (such as the address, the slot and circuit) for this address entry for storage into the memories within ingress classification unit 202.

With regard to egress memories, egress CAM 224, egress on-chip memory 222 and egress memory 226 include a number of tables, such that the tables comprise a number of address entries. In an embodiment, an address entry stored in a table within egress CAM 224 has a corresponding address entry stored in a table within egress on-chip memory 222 as well as a corresponding address entry stored in a table within egress memory 226. In an embodiment, an address entry stored in a table within egress CAM 224 includes prefix 630, address 632, virtual local area network (VLAN) identification 634 and filler 636. In one embodiment, an address entry stored in a table within egress on-chip memory 222 includes timer bits 638 and delayed update bits 640. In one embodiment, an address entry stored in a table within egress memory 226 includes slot 642 and circuit 644.

To help illustrate, egress CAM 224 includes an address entry that includes MAC bridge for prefix 630, 12.55.33.29.77.52 for address 632, 15.43 for VLAN identification 634 and 0.0.0.0 for filler 636. The corresponding address entry within egress on-chip memory 222 includes 111 for timer bits 638 and 10 for delayed update bits 640. The corresponding address entry within egress memory 226 includes 05 for slot 642 and 02 for circuit 644.

Moreover, as shown, in an embodiment, the address entries stored within egress CAM 224, egress on-chip memory 222 and egress memory 226 are divided into a number of sections. In one embodiment, the sections include a section for egress locally learned entries 646 and a section for egress remotely learned entries 648. As will be described in more detail below, egress locally learned entries 648 are those address entries that are learned from packets received into egress logic 106. Returning to FIG. 1 to help illustrate, assume that egress logic 106 receives a packet from packet mesh 126 wherein the source address of the packet is not found within the entries for address 632 in egress CAM 224. Accordingly, egress classification unit 220 generates a new address entry, as one of egress locally learned entries 646, for this source address within egress CAM 224, egress on-chip memory 222 and egress memory 226.

Additionally, as will be described in more detail below (and as noted by the arrows within FIG. 6), egress remotely learned entries 648 are those address entries that are learned from packets that received into ingress logic 104. In particular in one embodiment, a new address entry (within egress CAM 224, egress on-chip memory 222 and egress memory 226) is generated by CAM lookup engine 218 (within ingress classification unit 202), wherein communication logic 221 transmits this new information (such as the address, the slot and circuit) for this address entry for storage into the memories within egress classification unit 220.

In one embodiment, ingress CAM 206 and/or egress CAM 224 can store more than just address entries as described herein. In one embodiment, if the entry is for addresses, prefix 602/630 can be of type: (1) MAC Bridge—indicating that a valid address entry for a MAC address is stored in this entry, (2) MAC Free—indicating that this entry (used for locally learned address entries) is for a MAC address but that the entry is not valid/active, and (3) MAC Not Used—indicating that this entry (used for remotely learned address entries) is for a MAC address but that the entry is not valid/active.

In an embodiment, an entry within ingress CAM 206 and egress CAM 224 includes address 604 and address 632, respectively, which stores the address associated with the source location (the origination). In one embodiment, this address is a MAC address. In another embodiment, this address is an IP address. In an embodiment, an entry within ingress CAM 206 and egress CAM 224 includes a VLAN identification 606 and VLAN identification 634, respectively, which stores the VLAN identification associated with address 604 and address 632. In an embodiment, an entry within ingress CAM 206 and egress CAM 224 includes filler 608 and filler 636, respectively, that can store additional information for this address.

With regard to ingress on-chip memory 204 and egress on-chip memory 222, these memories comprise tables that include timer bits 610 and 638 for the address entries. In an embodiment, timer bits 610 and 638 are employed to track the age of a given address entry. Accordingly, after a given time period wherein the address entry has not been refreshed (which is described in more detail below), the address entry is considered free such that the entry is no longer considered to include valid data. In one embodiment, timer bits 610 and 638 are set to 00 if the address entry is not in use. In an embodiment, timer bits 610 and 638 are set to 11 if the entry is refreshed and are set to 10 if the entry has timed out for a first time period and are set to 01 if the entry has timed out for a second time period. Therefore, in such embodiments, when an address entry has not been refreshed for three time periods, the address entry is marked as free (e.g., MAC free) and therefore will not be considered valid or subject to a match during a table lookup.

In an embodiment, delayed update bits 612 and 640 are employed to indicate whether a given address entry (stored across the different memories) was stored in the remote classification unit during the updating of the address entry in the local classification unit. As will be described in more detail below, memories associated with a remote classification unit may not be able to be updated at a same time that the associated address entry within memories associated with the local classification unit, because, for example, other address entries in such memories are being updated. For example, ingress classification unit 202 may not be able to update egress on-chip memory 222, egress CAM 224 and egress memory 226, because such memories are being updated by their local lookup engines (e.g., on-chip memory lookup engine 230, CAM lookup engine 236 and off-chip memory lookup engine 238).

With regard to ingress memory 208 and egress memory 226, such memories comprise tables that include slots 614/642 and circuits 616/644 for the address entries. In one embodiment, slots 614/642 define the number of the line card within the network element that received the packet having the address stored in addresses 604/632 for the corresponding address entry within ingress/egress CAMs 206/224. In an embodiment, circuits 616 define the number of define the port on the given line card within the network element that received the packet having the address stored in addresses 604/632 for the corresponding address entry within ingress/egress CAM 206/224.

Returning to block 504, in an embodiment, CAM lookup engine 218 performs the table lookup based on the source MAC address by traversing ingress CAM 206 to locate address entry having the source MAC address.

In block 506, a decision is made whether an address entry matches the source address for the packet. With reference to the exemplary embodiment of FIG. 4, CAM lookup engine 218 determines whether an address entry matches the address for the packet, by traversing the addresses within the column for address 604 of ingress CAM 206. In an embodiment, CAM lookup engine 218 traverses those address entries whose prefix 602 indicates that this address entry is a valid one—MAC Bridge.

In block 508, upon determining that an address entry within ingress CAM 206 matches the source address for the packet, a decision is made whether the data in this entry is the same as the data for the packet. With reference to the exemplary embodiment of FIG. 4, CAM lookup engine 218 determines whether the data in this entry is the same as the data for the packet. Although the type of data compared can vary, in one embodiment, the data compared between the entry and the data for the packet include the VLAN ID, the slot and the circuit. In particular, data from a given address can change. For example, the network element that includes ingress classification unit 202 can be re-provisioned such that a packet having a given source address is now being received on a different slot and/or different circuit or is within a different VLAN. Accordingly, the data within the address entries across the different ingress memories need to be updated with the correct information. In one embodiment, CAM lookup engine 218 determines whether the entry for the VLAN ID 606 for this entry (stored in ingress CAM 206) is the same as the VLAN ID extracted from the header of the packet.

In one embodiment, CAM lookup engine 218 generates a request (that is transmitted to off-chip memory lookup engine 216) to retrieve the slot and the circuit in the associated entry within ingress memory 208. With regard to the embodiment illustrated in FIG. 4, this request is transmitted through on-chip memory lookup engine 212, which forwards such a request to off-chip memory lookup engine 216. These communications are described in more detail in co-pending patent application, entitled "A Method and Apparatus for Accessing Routing Data from Memory", Ser. No. 10/292,000, filed Nov. 12, 2002 to Ranjit Rozario. Off-chip memory lookup engine 216 receives this request and performs a lookup of this entry into ingress memory 208 (through memory controller 406). In an embodiment off-chip memory lookup engine 216 generates a response that includes the slot and the circuit for this entry and transmits this response back to CAM lookup engine 218. CAM lookup engine 218 determines whether the slot and circuit returned from off-chip memory lookup engine 216 matches the slot and circuit for this packet.

However, embodiments of the invention are not so limited. In another embodiment, CAM lookup engine 218 transmits a request to off-chip memory lookup engine 216, which includes the slot and circuit. Off-chip memory lookup engine 216 determines whether the slot and circuit stored in associated entry within ingress memory 208 matches the slot and circuit received from CAM lookup engine 218. Accordingly, off-chip memory lookup engine 216 transmits a value back to CAM lookup engine 218 indicating if the slot and circuit within the associated entry of ingress memory 208 matches the slot and circuit received from CAM lookup engine 218.

In block 510, upon determining that the data in the entry is not the same as the data from the packet, the data in the entry is updated. With reference to the exemplary embodiment of FIG. 4, CAM lookup engine 218 updates the data for VLAN ID 606 for this entry (if such data is different from the data received from the packet). Additionally, if the data for slot 614 and/or circuit 616 (stored in ingress memory 208) are different from the data associated with the packet, CAM lookup engine 218 generates a request (that is transmitted to off-chip memory lookup engine 216) to update the values for slot 614 and/or circuitry 616 for the associated entry within ingress memory 208. Accordingly, off-chip memory lookup engine 216 modifies the data for slot 614 and/or circuit 616 for this entry.

In block 514, whether the data in the entry is the same as the data associated with the packet, the timer for this entry is reset. As described above, a given entry includes a set of timer bits 610 (stored in ingress on-chip memory 204) that indicates the age of the entry. Moreover, as will be described in more detail below, this value is periodically decremented such that the address entry is considered free and the entry is no longer considered to include valid data. Accordingly, in an embodiment, when an entry is read and/or updated, these timer bits are reset such that the data is considered fresh. For example, timer bits 610 are set to 11 if the entry is refreshed. Additionally, timer bits 610 are decremented down to 00, wherein the address entry is considered to not include valid data.

With reference to the exemplary embodiment of FIG. 4, CAM lookup engine 218 generates a request to reset timer bits 610. CAM lookup engine 218 forward this request to on-chip memory lookup engine 212. On-chip memory lookup engine 212 updates timer bits 612 for this entry. In an embodiment, CAM lookup engine 218 forwards this request to on-chip memory lookup engine 212 through the ring of lookup engines and logic (as described above).

In block 516, upon determining that an address entry within ingress CAM 206 does not match the source address for the packet, an entry is added to the local tables of the local classification unit. With reference to the exemplary embodiment of FIG. 4, CAM lookup engine 218 adds an entry to ingress CAM 206. In one embodiment, CAM lookup engine 218 will include the address and the VLAN ID for this packet. Additionally, CAM lookup engine 218 will set prefix 602 for this entry to MAC Bridge, indicating that the data is valid for this entry. In one embodiment, CAM lookup engine 218 adds this entry into section within ingress CAM 206 for the ingress locally learned entries 618.

Additionally, CAM lookup engine 218 generates a request to add an associated entry into ingress on-chip memory 204. CAM lookup engine 218 forwards this request to on-chip memory lookup engine 212. On-chip memory lookup engine 212 adds this associated entry into on-chip memory 204, wherein timer bits 610 for this entry are set to the freshest value (i.e., 11) and wherein delayed update bits 612 are set to zero (indicating that a delayed update is not needed).

CAM lookup engine 218 also generates a request to add an associated entry into ingress memory 208. In an embodiment, the request includes the slot and circuit for which the packet is associated. CAM lookup engine 218 forwards this request to off-chip memory lookup engine 216. Off-chip memory lookup engine 216 adds this associated entry into ingress memory 208, wherein the slot value and the circuit value received within the request are stored in slot 614 and circuit 616 for this entry.

In block 518, an attempt is made to transmit an update message to the remote classification unit. With reference to the exemplary embodiment of FIG. 4, CAM lookup engine 218 attempts to transmit the update message to the remote classification unit (which in this example is egress classification unit 220) into outgoing buffer 326 within communication logic 210. In particular, outgoing buffer 326 could be full, thereby not enabling the storage of the update message therein.

In block 520, a decision is made on whether the attempt is successful. With reference to the exemplary embodiment of FIG. 4, CAM lookup engine 218 determines whether the attempt to store this message into outgoing buffer 326 (of communication logic 210 shown in FIG. 3) is successful. In one embodiment, communication logic 210 transmits a message back to CAM lookup engine 326 that indicates whether the message was stored into outgoing buffer 326.

In block 522, upon determining that the attempt was not successful, this entry is marked as needing a low priority update. With reference to the exemplary embodiment of FIG. 4, CAM lookup engine 218 generates a request to mark this entry as needing a low priority update. CAM lookup engine 218 transmits this request to on-chip memory lookup engine 212. On-chip memory lookup engine 212 sets delayed update bits 612 to a value indicating that a low priority update is needed (i.e., '01'). Additionally, whether the attempt was successful or not, a new request for a table lookup for a packet is received, as the processing of such requests continues.

The operations of flow diagram 550 of FIG. 5B will now be described. In particular, FIG. 5B illustrates a flow diagram for processing of lookup requests for the destination address of a packet, according to one embodiment of the invention.

In block 552, a request for a table lookup for a packet is received. With reference to the exemplary embodiment of FIG. 4, CAM lookup engine 218 receives the request for a table lookup for a packet. In an embodiment, the packet received is based on different standards, such as ATM, IP, Frame Relay, voice over IP, PPP, Ethernet, etc. In one embodiment, one of execution units 214 within ingress classification unit 202 receives a packet and extracts the relevant routing data from the packet (such as the packet header that include the source address, source port, destination address and destination port). In one embodiment, the source address and the destination address are Media Access Control (MAC) addresses. Execution unit 214 generates a request for a table lookup for the packet received and transmits this request to CAM lookup engine 218.

In block 554, a table lookup is performed. With reference to the exemplary embodiment of FIG. 4, CAM lookup engine 218 performs the table lookup into ingress CAM 206 through memory controller 402. In an embodiment, CAM lookup engine 218 performs the table lookup based on the destination MAC address from within the packet header. The details of these operations for a table lookup are described above in conjunction with block 504 in FIG. 5A.

In block 556, a decision is made whether an address entry matches the destination address for the packet. With reference to the exemplary embodiment of FIG. 4, CAM lookup engine 218 determines whether an address entry matches the address for the packet, by traversing the addresses within the column for address 604 of ingress CAM 206. In an embodiment, CAM lookup engine 218 traverses those address entries whose prefix 602 indicates that this address entry is a valid one—MAC Bridge.

In block 558, upon determining that an address entry within ingress CAM 206 matches the destination address for the packet, a decision is made whether the data in this entry is the same as the data for the packet. With reference to the exemplary embodiment of FIG. 4, CAM lookup engine 218 determines whether the data in this entry is the same as the data for the packet. Although the type of data compared can vary, in one embodiment, the data compared between the entry and the data for the packet include the VLAN ID, the slot and the circuit. In particular, data from a given address can change. For example, the network element that includes ingress classification unit 202 can be re-provisioned such that a packet having a given destination address is now being outputted on a different slot and/or different circuit or is within a different VLAN. Accordingly, the data within the address entries across the different ingress memories need to be updated with the correct information. In one embodiment, CAM lookup engine 218 determines whether the entry for the VLAN ID 606 for this entry (stored in ingress CAM 206) is the same as the VLAN ID extracted from the header of the packet.

In one embodiment, CAM lookup engine 218 generates a request (that is transmitted to off-chip memory lookup engine 216) to retrieve the slot and the circuit in the associated entry within ingress memory 208. With regard to the embodiment illustrated in FIG. 4, this request is transmitted through on-chip memory lookup engine 212, which forwards such a request to off-chip memory lookup engine 216. These communications are described in more detail in co-pending patent application, entitled "A Method and Apparatus for Accessing Routing Data from Memory", Ser. No. 10/292,000, filed Nov. 12, 2002 to Ranjit Rozario. Off-chip memory lookup engine 216 receives this request and performs a lookup of this entry into ingress memory 208 (through memory controller 406). In an embodiment off-chip memory lookup engine 216 generates a response that includes the slot and the circuit for this entry and transmits this response back to CAM lookup engine 218. CAM lookup engine 218 determines whether the slot and circuit returned from off-chip memory lookup engine 216 matches the slot and circuit for this packet.

However, embodiments of the invention are not so limited. In another embodiment, CAM lookup engine 218 transmits a request to off-chip memory lookup engine 216, which includes the slot and circuit. Off-chip memory lookup engine 216 determines whether the slot and circuit stored in associated entry within ingress memory 208 matches the slot and circuit received from CAM lookup engine 218. Accordingly, off-chip memory lookup engine 216 transmits a value back to CAM lookup engine 218 indicating if the slot and circuit within the associated entry of ingress memory 208 matches the slot and circuit received from CAM lookup engine 218.

In block 560, upon determining that the data in the entry is not the same as the data from the packet, the data in the entry is updated. With reference to the exemplary embodiment of FIG. 4, CAM lookup engine 218 updates the data for VLAN ID 606 for this entry (if such data is different from the data received from the packet). Additionally, if the data for slot 614 and/or circuit 616 (stored in ingress memory 208) are different from the data associated with the packet, CAM lookup engine 218 generates a request (that is transmitted to off-chip memory lookup engine 216) to update the values for slot 614 and/or circuitry 616 for the associated entry within ingress memory 208. Accordingly, off-chip memory lookup engine 216 modifies the data for slot 614 and/or circuit 616 for this entry.

In block 562, whether the data in the entry is the same as the data associated with the packet, the packet is forwarded based on the data within the entry stored in the table of ingress memory 208. With reference to the exemplary embodiment of FIG. 4, CAM lookup engine 218 returns the slot and the circuit for this packet back to the requesting execution unit 214. Execution unit 214 forwards the packet out from ingress logic 104 based on the slot and the circuit. Returning to FIG. 1 to help illustrate, assume that the packet was received into ingress logic 104A such that CAM lookup engine 218 determines that the slot for this packet is four (which is associated with line card 102D). Additionally, assume that CAM lookup engine 218 determines that the circuit for this packet is port three of this slot. Accordingly, ingress logic 104 forwards the packet to egress logic 106D on line card 102D through packet mesh 126, wherein the packet is forwarded out on port three.

In block 564, the timer for this entry is reset. As described above, a given entry includes a set of timer bits 610 (stored in ingress on-chip memory 204) that indicates the age of the entry. Moreover, as will be described in more detail below, this value is periodically decremented such that the address entry is considered free and the entry is no longer considered to include valid data. Accordingly, in an embodiment, when an entry is read and/or updated, these timer bits are reset such that the data is considered fresh. For example, timer bits 610 are set to 11 if the entry is refreshed. Additionally, timer bits 610 are decremented down to 00, wherein the address entry is considered to not include valid data.

With reference to the exemplary embodiment of FIG. 4, CAM lookup engine 218 generates a request to reset timer bits 610. CAM lookup engine 218 forward this request to on-chip memory lookup engine 212. On-chip memory lookup engine 212 updates timer bits 612 for this entry. In an embodiment, CAM lookup engine 218 forwards this request to on-chip memory lookup engine 212 through the ring of lookup engines and logic (as described above).

In block 566, upon determining that an address entry within ingress CAM 206 does not match the destination address for the packet, the packet is broadcasted. With reference to the exemplary embodiment of FIG. 4, CAM lookup engine 218 broadcasts the packet to the other line cards in the given network element. The CAM lookup engines 218 on the receiving line cards perform a lookup requests for both the source and destination as described in conjunction with flow diagrams 500 and 550. Accordingly, for a line card that does not have information related to the source address, the logic within the line card can update its memory, as described in flow diagram 500.

Further, for a line card that does not have information related to the destination address, in one embodiment, the logic therein broadcasts the packet out from the circuits associated with this line card. Accordingly, the correct destination will receive the packet, while the other network elements will ultimately drop the broadcasted packets that were received. In one embodiment, the correct destination will send a response back to the source indicating that the packet was received. Accordingly, the logic in the line card that received the packet into the network element and the logic in the line card that outputted the packet from the network element will receive this response and can update its tables regarding the destination address of the packet (which is the source address of the response).

Updating Entries for Packet Routing

Figure 7:
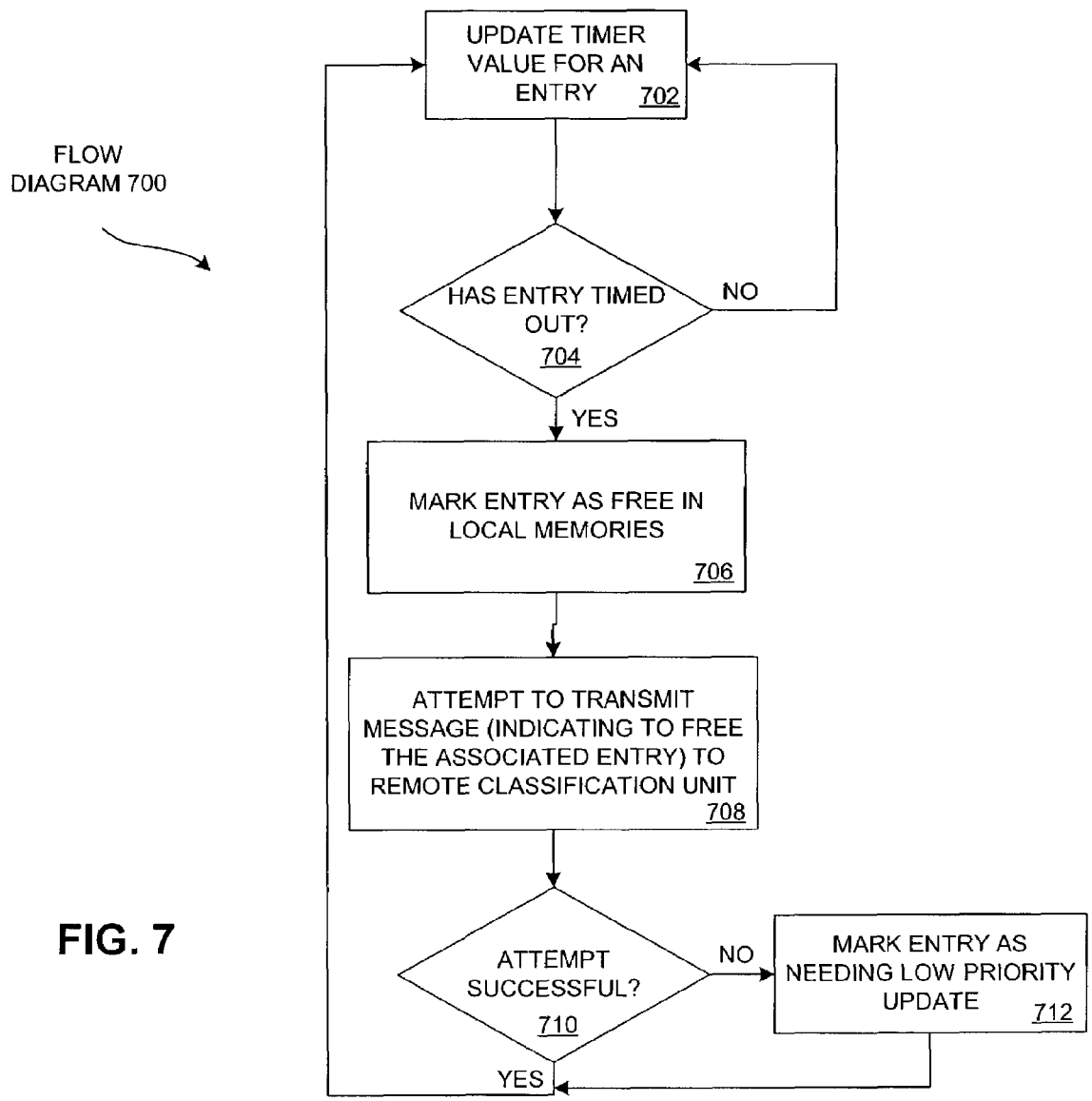
FIG. 7 illustrates a flow diagram for updating entries for packet routing, according to one embodiment of the invention.

The operations of updating the timer values for these entries will now be described. In particular, FIG. 7 illustrates a flow diagram for updating entries for packet routing, according to one embodiment of the invention. The operation of flow diagram 700 will be described with reference to the exemplary systems shown FIGS. 2-4. Additionally, the operation of flow diagram 700 will be describe with reference to updating of entries for packet routing within ingress logic 104. However, the operations of flow diagram 700 are also applicable to egress logic 106.

In block 702, a timer value for an entry is updated. With reference to the exemplary embodiment of FIG. 4, decrementer logic 252 (within on-chip memory lookup engine 212) updates timer bits 610 within ingress on-chip memory 204. In one embodiment, when an entry is added, modified or read, the value of timer bits 610 is set to '11' for this entry. Decrementer logic 252 updates the value of timer bits 610 such that the value is decremented by one. For example, if the current value of timer bits 610 is '11', decrementer logic 252 sets the value to '10'. To further illustrate, if the current value of timer bits 610 is '10', decrementer logic 252 sets the value to '01'. In such embodiment, timer bits 610 include four states. However, embodiments of the invention are not so limited, as timer bits 610 can include a lesser or greater number of states, thereby varying the life of a given entry.

In block 704, a decision is made whether the entry that was updated has timed out. With reference to the exemplary embodiment of FIG. 4, decrementer logic 252 determines whether the entry that was updated has timed out. In the example, illustrated above, decrementer logic 252 determines whether the entry has timed out by determining if timer bits 610 equal '00' for this entry.

If the entry that was updated has not timed out, the timer value is again updated (at block 702). As shown, this updating of the timer value and determining whether the entry has timed out continues until the entry has timed out. As described above, in one embodiment, if an entry is read and/or updated this timer value is reset to being refreshed ('11') based on a request from CAM lookup engine 218.

In block 706, if the entry that was updated has timed out, the entry is marked as free in the local memories. With reference to the exemplary embodiment of FIG. 4, decrementer logic 252 transmits a request to CAM lookup engine 218 to mark prefix 602 within ingress CAM 206 for this entry as free (MAC FREE). Accordingly, CAM lookup engine 218 marks prefix 602 within ingress CAM 206 for this entry as free.

In block 708, an attempt is made to transmit a message (indicating to free the associated entry in the remote memories) to the remote classification unit. With reference to the exemplary embodiment of FIGS. 3 and 4, decrementer logic 252 attempts to store a message (indicating to free the associated entry in the remote memories) into outgoing buffer 326.

In block 710, a decision is made whether the attempt is successful. With reference to the exemplary embodiment of FIGS. 3 and 4, decrementer logic 252 determines whether the attempt to store this message into outgoing buffer 326 (of communication logic 210 shown in FIG. 3) is successful. In one embodiment, communication logic 210 transmits a message back to decrementer logic 252 that indicates whether the message was stored into outgoing buffer 326.

In block 712, if the attempt was not successful, the entry is marked as needing a low priority update. With reference to the exemplary embodiment of FIGS. 3 and 4, decrementer logic 252 marks the entry as needing a low priority update. Whether or not the attempt was successful, the updating of timer values for entries within local on-chip memories continues at block 702.

Low Priority Update

Figure 8:
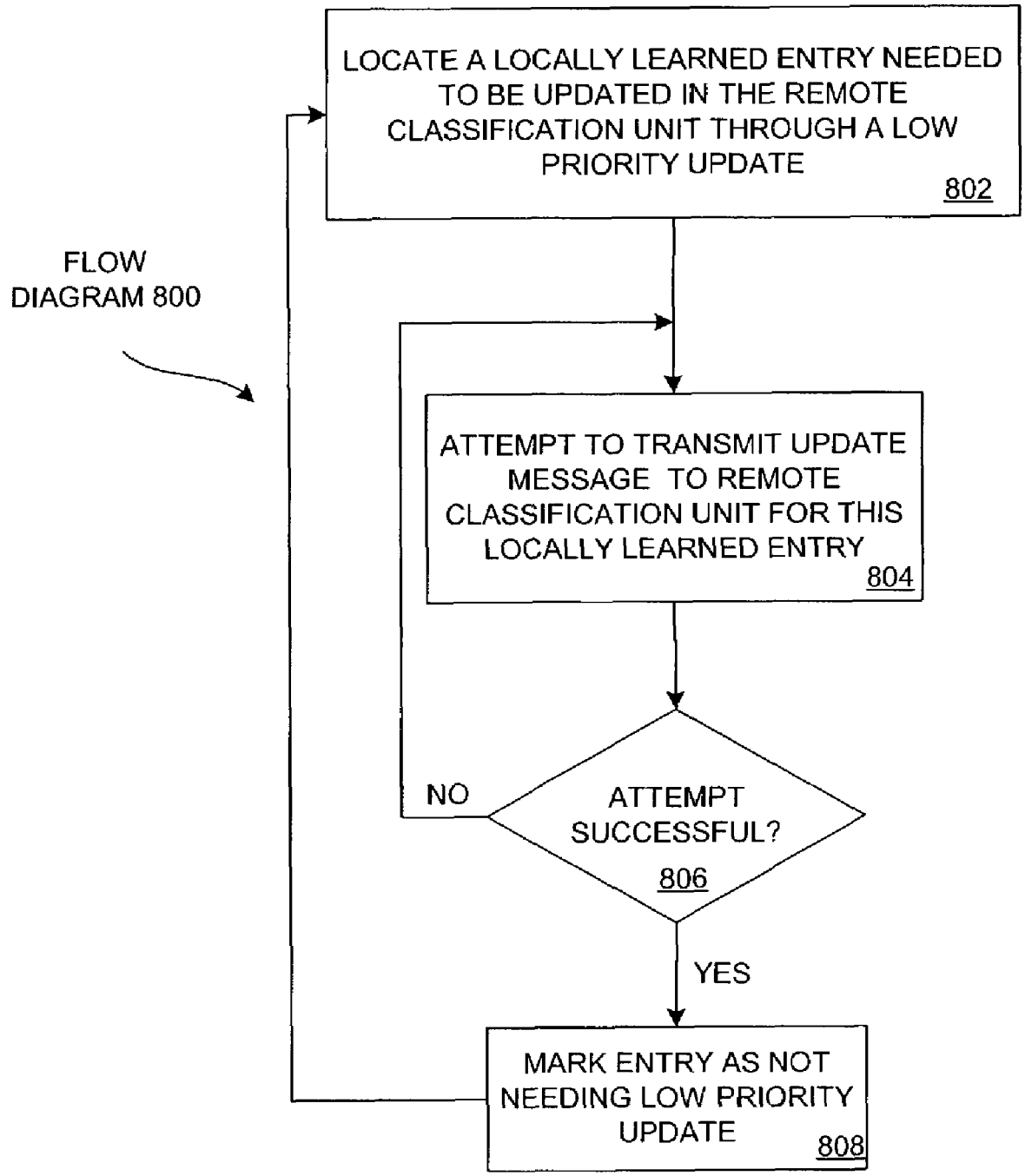
FIG. 8 illustrates a flow diagram for performing a low priority update of locally learned entries within the ingress/egress memories, according to one embodiment of the invention.

The operations for performing a low priority update of locally learned entries within the ingress/egress memories will now be described. In particular, FIG. 8 illustrates a flow diagram for performing a low priority update of locally learned entries within the ingress/egress memories, according to one embodiment of the invention. The operation of flow diagram 800 will be described with reference to the exemplary systems shown FIGS. 2-4. Additionally, the operation of flow diagram 800 will be describe with reference to performing a low priority update of locally learned entries within ingress memories associated with ingress logic 104. However, the operations of flow diagram 800 are also applicable to egress memories associated with egress logic 106.

In block 802, a locally learned entry needed to be updated in the remote classification unit through a low priority update is located. With reference to the exemplary embodiment of FIG. 4, low priority logic 204 locates a locally learned entry needed to be updated in the remote classification unit through a low priority update.

In block 804, an attempt is made to transmit an update message to the remote classification unit for this locally learned entry. With reference to the exemplary embodiment of FIG. 4, low priority logic 204 attempts to transmit an update message to the egress classification unit 220 for this locally learned entry In block 806, a decision is made whether the attempt is successful. With reference to the exemplary embodiment of FIGS. 3 and 4, low priority update logic 204 determines whether the attempt to store this message into outgoing buffer 328 (of communication logic 210 shown in FIG. 3) is successful. In one embodiment, communication logic 210 transmits a message back to low priority update logic 204 that indicates whether the message was stored into outgoing buffer 328. Upon determining that the attempt was not successful, low priority update logic 204 continues to attempt to store the message into outgoing buffer 328 (in block 804).

Upon determining that the attempt was successful, this entry is marked as not needing a low priority update. With reference to the exemplary embodiment of FIG. 4, low priority update logic 204 generates a request to mark this entry as not needing a low priority update. Low priority update logic 204 transmits this request to on-chip memory lookup engine 212. On-chip memory lookup engine 212 sets delayed update bits 612 to a value indicating that a low priority update is not needed (i.e., '00'). Additionally, the operations continue at block 802, wherein the other locally learned entries are scanned to locate those entries that need a low priority update.

Figure 9:
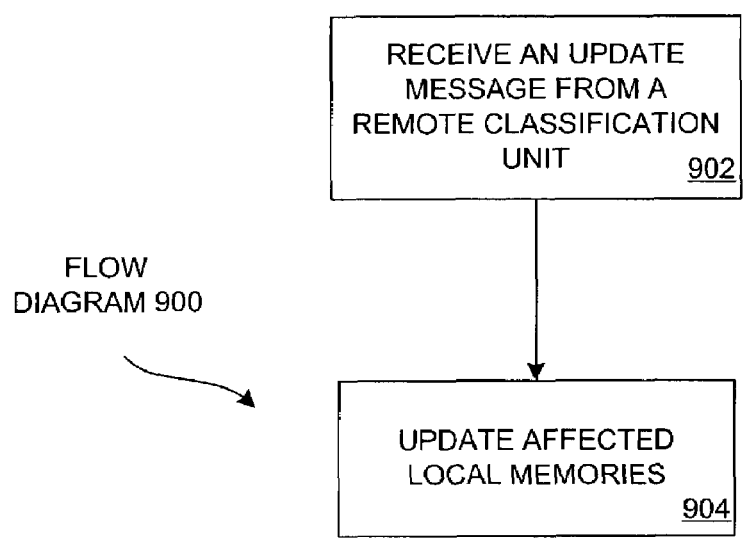
FIG. 9 illustrates a flow diagram for updating local memories based on update message from a remote classification unit, according to one embodiment of the invention.

Updating Local Memories Based on Update Messages from a Remote Classification Unit The operations for updating local memories based on update messages from a remote classification unit will now be described. In particular, FIG. 9 illustrates a flow diagram for updating local memories based on update message from a remote classification unit, according to one embodiment of the invention. The operation of flow diagram 900 will be described with reference to the exemplary systems shown FIGS. 2-4. Additionally, the operation of flow diagram 900 will be describe with reference to updating local memories associated with egress logic 106. However, the operations of flow diagram 900 are also applicable to egress memories associated with egress logic 104.

In block 902, an update message is received from a remote classification unit. With reference to the exemplary embodiment of FIG. 4, communication logic 228 receives the update message from communication logic 210 (within ingress classification unit 202). In particular, as described above, this update message received can be associated with a real time update or a low priority update.

In block 904, the appropriate local memories are updated. With reference to the exemplary embodiment of FIG. 4, communication logic 228 transmits messages to the appropriate lookup engines to update their memories. For example, an update message being received by communication logic 228 (within egress classification unit 220) could indicate that a new entry needs to be added. Accordingly, communication logic 228 transmits an update message to CAM lookup engine 236, which adds the entry to the section of egress CAM 224 associated with egress remotely learned entries 648 (as shown in FIG. 6). In an embodiment, CAM lookup engine 236 transmits other update messages to the appropriate lookup engines. For example, CAM lookup engine 236 generates and transmits update messages to on-chip memory lookup engine 230 and off-chip memory lookup engine 238, wherein such lookup engines update the section of their memories associated with egress remotely learned entries 648 by adding entries associated with the entry within egress CAM 224.

In another embodiment, only one of the number of local memories needed to be updated. For example, if an entry is updated such that the slot and circuit for a given entry is now changed, an update message is sent to off-chip memory lookup engine 238, which updates slot 642 and circuit 644 for this entry.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for updating of routing data in a network element have been described. Although the present invention has been described with reference to specific exemplary embodiments, it will be evident that various modifications and changes may be made to these embodiments without departing from the broader spirit and scope of the invention. For example, while embodiments of the invention are described such that routing data is stored across a number of different memories with a number of memory lookup engines reading and updating such memories, in other embodiments, such routing data is stored in a single memory that includes a single memory lookup engine for reading and updating of this single memory. Accordingly, the specification and drawings are to be regarded in an illustrative rather than a restrictive sense.

What is claimed is:

1. A computer-implemented method comprising:
receiving a request for routing data for a data packet in a local memory of a first portion of a line card in a network element;
updating the local memory upon determining that the routing data for the data packet is not found; and
updating a remote memory with the routing data for the data packet of a second portion of the line card of the network element, wherein updating the remote memory comprises updating the remote memory through a low priority update upon determining that the remote memory is unavailable when the local memory is updated.

2. The computer-implemented method of claim 1, comprising updating the local memory upon determining that the routing data for the data packet is different from the routing data stored in the local memory.

3. The computer-implemented method of claim 2, comprising updating the remote memory with the routing data that is different.

4. The computer-implemented method of claim 1, wherein the first portion of the line card in the network element is an ingress portion and wherein the second portion of the line card in the network element is an egress portion.

5. The computer-implemented method of claim 1, wherein the first portion of the line card in the network element is an egress portion and wherein the second portion of the line card in the network element is an ingress portion.

6. The computer-implemented method of claim 1, wherein updating the remote memory comprises updating the remote memory independent of the low priority update upon determining that the remote memory is available when the local memory is updated.

7. The computer-implemented method of claim 1, wherein updates to the remote memory by a local memory lookup engine in the second portion have a higher priority than updates to the remote memory by a remote memory lookup engine in the first portion.

8. The computer-implemented method of claim 1, comprising marking an entry in the local memory that indicates that the entry needs a low priority update to the remote memory.

9. The computer-implemented method of claim 1, wherein updating the local memory upon determining that the routing data for the data packet is not found comprises adding an entry to the local memory.

10. The computer-implemented method of claim 9, comprising setting a timer associated with the entry within the local memory, wherein the entry is invalid when the associated timer expires.

11. The computer-implemented method of claim 10, comprising resetting the timer when the entry is read.

12. The computer-implemented method of claim 10, comprising resetting the timer when the entry is modified.

13. The computer-implemented method of claim 10, wherein an entry within the remote memory that is associated with the entry in the local memory is updated when the timer expires, the update of the entry in the remote memory comprises marking the entry as invalid.

14. The computer-implemented method of claim 13, wherein the entry within the remote memory is updated through a low priority update upon determining that the remote memory is unavailable when the timer expires.

15. An apparatus comprising:
a local memory; and
a classification unit coupled to receive a number of data packets, wherein the classification unit comprises,
an execution unit to generate a request for routing data for a data packet of the number of data packets;
a memory lookup engine coupled to the execution unit and the local memory, the local memory to store routing data for the number of data packets, the memory lookup engine to receive the request and to update the local memory upon determining that the routing data for the data packet is not found in the local memory; and
a communication logic coupled to the memory lookup engine, the communication logic to transmit an update message to a remote logic, the update message to cause the remote logic to update an remote memory, wherein the update message is transmitted based on a low priority update upon determining that a buffer for update messages of the remote memory is full when the local memory is updated.

16. The apparatus of claim 15, wherein the memory lookup engine is to update the local memory upon determining that the routing data for the data packet is different from the routing data stored in the local memory.

17. The apparatus of claim 16, wherein the communication logic is to transmit an update message to the remote logic when the routing data is different from the routing data stored in the local memory.

18. The apparatus of claim 17, wherein the update message that is based on the routing data being different is transmitted based on a low-priority update upon determining that the buffer for update messages of the remote memory is full when the local memory is updated.

19. The apparatus of claim 15, wherein the updating of the local memory by the memory lookup engine comprises adding an entry to the local memory.

20. The apparatus of claim 19, wherein the memory lookup engine is to set a timer associated with the entry within the local memory, wherein the entry is invalid when the associated timer expires.

21. The apparatus of claim 20, wherein the memory lookup engine is to reset the timer when the entry is read.

22. The apparatus of claim 20, comprising the memory lookup engine is to reset the timer when the entry is modified.

23. The apparatus of claim 20, wherein the communication logic is to transmit data indicating that an entry within the remote memory that is associated with the entry in the local memory is updated when the timer expires, the update of the entry in the remote memory comprises marking the entry as invalid.

24. The apparatus of claim 23, wherein the entry within the remote memory is updated through a low priority update upon determining that the remote memory is unavailable when the timer expires.

25. An apparatus comprising:
an execution unit to generate a request for routing data for a data packet;
a content addressable memory (CAM) lookup engine coupled to a CAM, the CAM to store routing data for data packets, the CAM lookup engine to receive the request and to update the CAM upon determining that the routing data for the data packet is not found in the CAM; and
a communication logic coupled to the CAM lookup engine, the communication logic to transmit an update message to a remote logic, the update message to cause the remote logic to update a remote memory, wherein the update message is based on a low priority update upon determining that a buffer for update message is not receiving update messages when the CAM is updated.

26. The apparatus of claim 25, wherein the CAM lookup engine is to update the CAM upon determining that the routing data for the data packet stored in the CAM is different from the routing data within the data packet.

27. The apparatus of claim 25, comprising an off-chip memory lookup engine coupled to an off-chip memory, the off-chip memory to store routing data for data packets, the off-chip memory lookup engine to update the off-chip memory upon determining that the routing data for the data packet is not found in the CAM.

28. The apparatus of claim 26, wherein the off-chip memory lookup engine is to update the off-chip memory upon determining that the routing data for the data packet stored in the CAM is different from the routing data within the data packet.

29. The apparatus of claim 28, comprising an on-chip memory lookup engine coupled to an on-chip memory, the on-chip memory lookup engine to set a timer in the on-chip memory associated with the routing data, wherein the routing data stored in the CAM and the off-chip memory are invalid when the associated timer expires.

30. A network element comprising:
a line card coupled to receive a number of data packets, wherein the line card comprises,
an ingress logic comprising,
an ingress execution unit to generate a request for routing data for a first data packet; and
an ingress content addressable memory (CAM) lookup engine coupled to an ingress CAM, the ingress CAM to store routing data for data packets, the ingress CAM lookup engine to receive the request and to update the ingress CAM upon determining that the routing data for the data packet is not found in the ingress CAM, the ingress CAM lookup engine to generate an update message upon determining that the routing data is not found in the ingress CAM; and
an egress logic coupled to the ingress logic, the egress logic comprising,
an egress execution unit to generate a request for routing data for a second data packet; and
an egress CAM lookup engine coupled to an egress CAM, the egress CAM to store routing data for data packets, the egress CAM lookup engine to receive the request and to update the egress CAM upon determining that the routing data for the data packet is not found in the egress CAM, the egress CAM lookup engine to generate an update message upon determining that the routing data is not found in the egress CAM, wherein the egress CAM lookup engine is to receive the update message from the ingress CAM lookup engine and to update the egress CAM based on the update message from the ingress CAM lookup engine, wherein the update message from the ingress CAM lookup engine is based on a low priority update upon determining that an ingress buffer for update messages are not receiving update messages when the ingress CAM is updated.

31. The network element of claim 30, wherein the ingress CAM lookup engine is to receive the update message from the egress CAM lookup engine and to update the ingress CAM based on the update message from the egress CAM lookup engine, wherein the update message from the egress CAM lookup engine is based on a low priority update upon determining that an egress buffer for update message are not receiving update message when the egress CAM is updated.

32. The network element of claim 30, wherein the ingress CAM lookup engine is to update the ingress CAM upon determining that the routing data for the data packet stored in the ingress CAM is different from the routing data within the first data packet.

33. The network element of claim 30, wherein the egress CAM lookup engine is to update the egress CAM upon determining that the routing data for the data packet stored in the egress CAM is different from the routing data within the second data packet.

34. The network element of claim 30, comprising an ingress on-chip memory lookup engine coupled to an ingress on-chip memory, the ingress on-chip memory lookup engine to set a timer in the ingress on-chip memory associated with the routing data, wherein the routing data stored in the ingress CAM is invalid when the associated timer expires.

35. The network element of claim 30, comprising an egress on-chip memory lookup engine coupled to an egress on-chip memory, the egress on-chip memory lookup engine to set a timer in the egress on-chip memory associated with the routing data, wherein the routing data stored in the egress CAM is invalid when the associated timer expires.

* * * * *